Aug. 19, 1958  T. L. BREWER  2,847,823
REVERSE THRUST NOZZLE CONSTRUCTION
Filed March 15, 1955  3 Sheets-Sheet 1
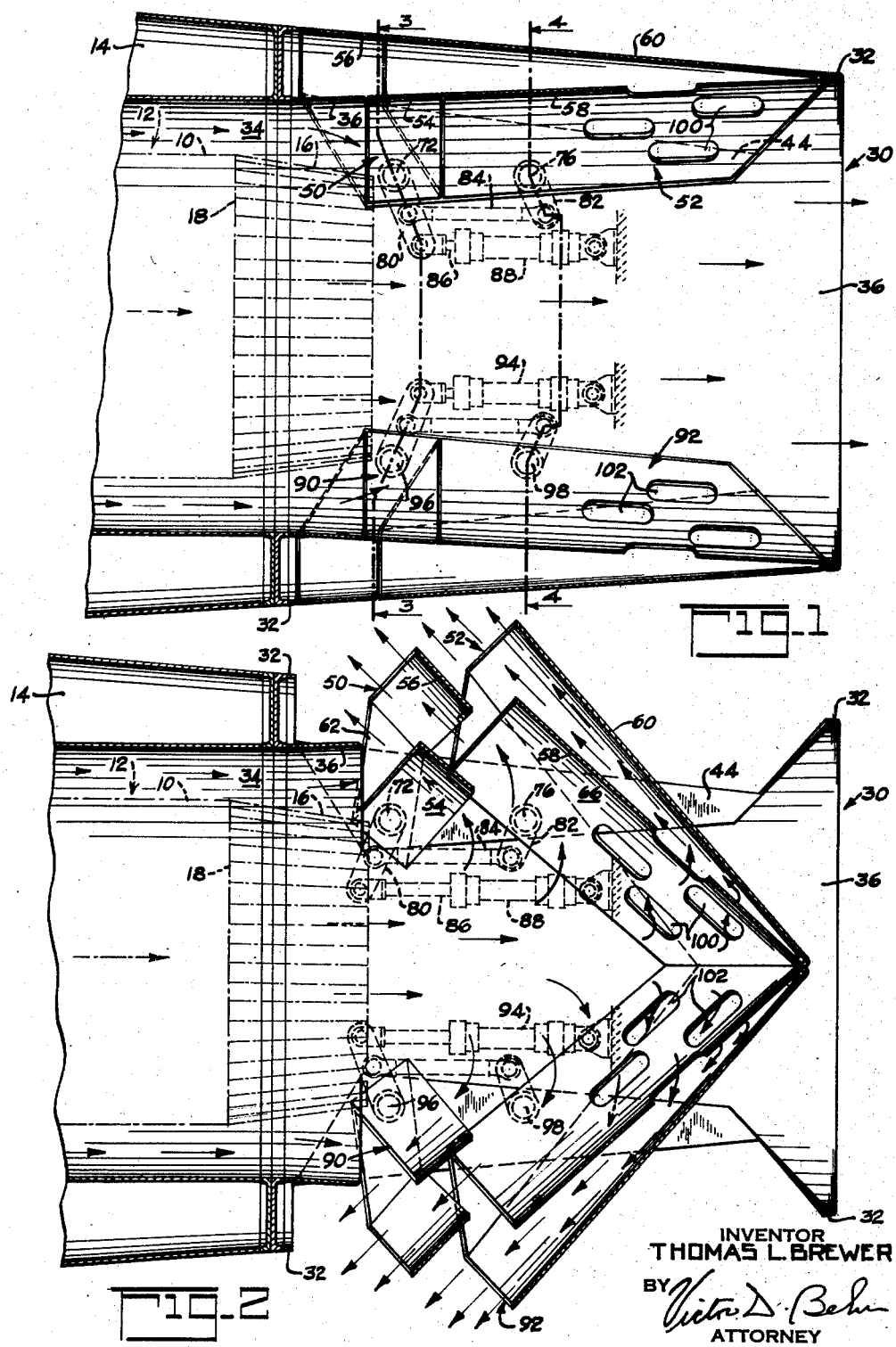
INVENTOR
THOMAS L. BREWER
BY
ATTORNEY Aug. 19, 1958     T. L. BREWER     2,847,823
REVERSE THRUST NOZZLE CONSTRUCTION
Filed March 15, 1955     3 Sheets-Sheet 2
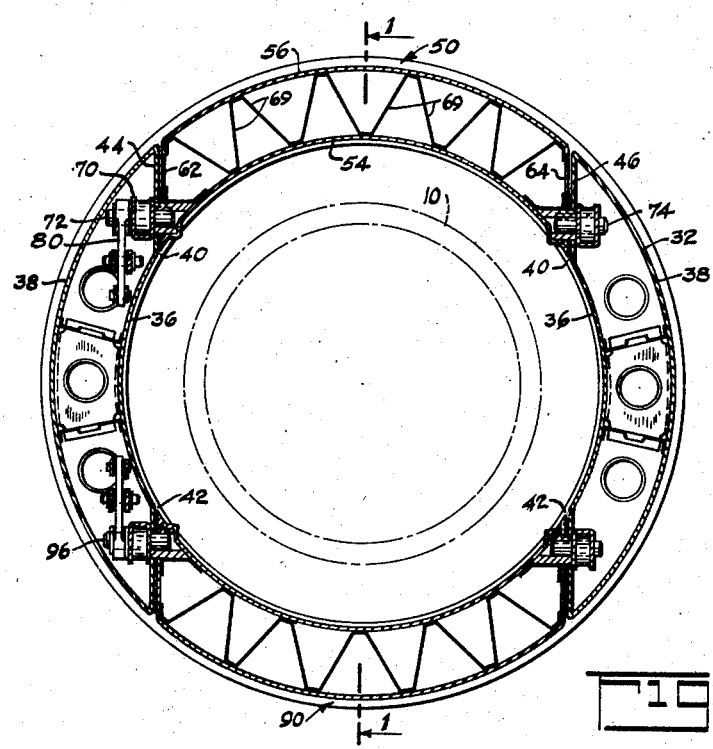
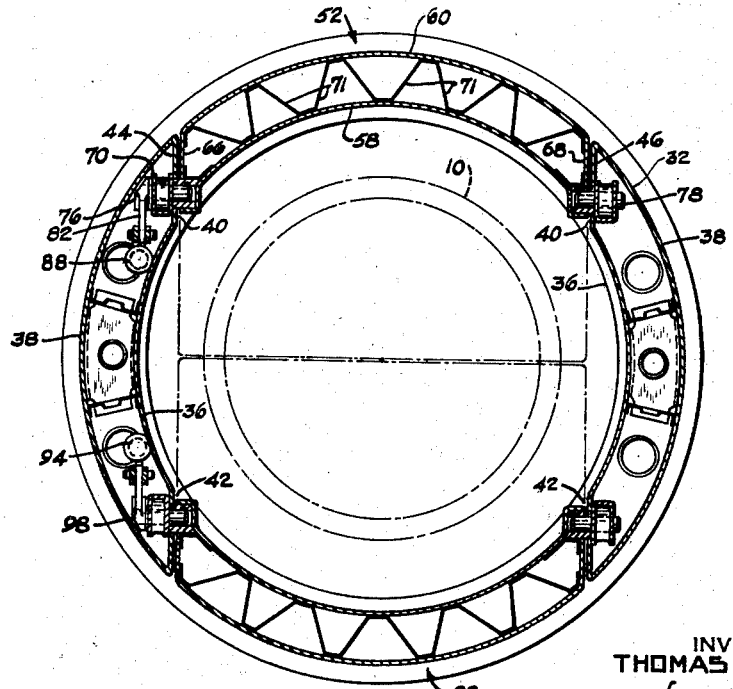
INVENTOR
THOMAS L. BREWER
BY
ATTORNEY

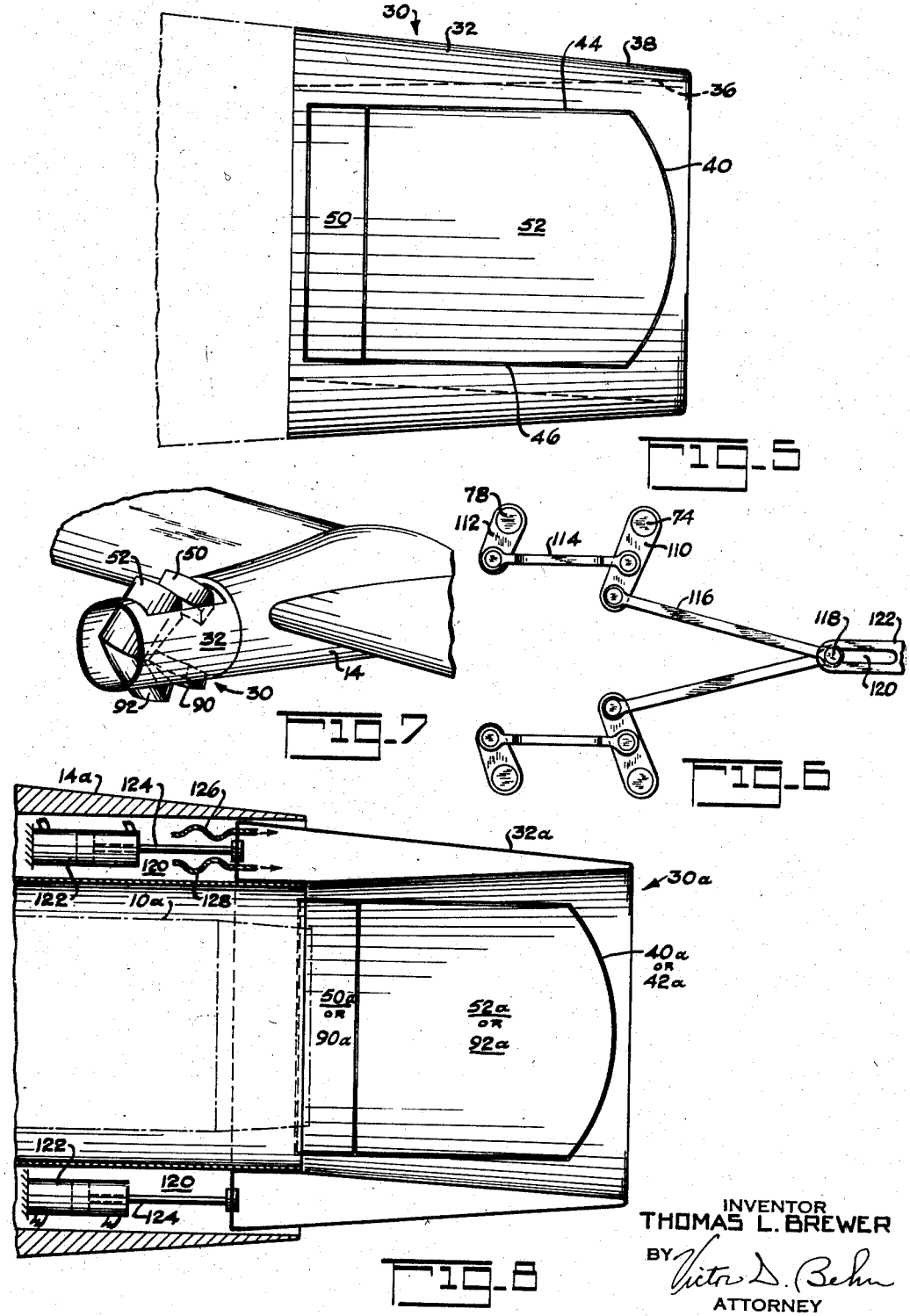

United States Patent Office 2,847,823
Patented Aug. 19, 1958

2,847,823

REVERSE THRUST NOZZLE CONSTRUCTION

Thomas L. Brewer, Ridgewood, N. J., assignor to Curtiss-Wright Corporation, a corporation of Delaware Application March 15, 1955, Serial No. 494,383

5 Claims. (Cl. 60—35.54)

This invention relates to jet-type aircraft engines and is particularly directed to the provision of means for reversing or changing the direction of the thrust of such engines.

An object of the present invention comprises the provision of novel and simple jet engine thrust reversing mechanism which is suitable for use in substantially all types of aircraft jet engine installations and, in its forward thrust position, said mechanism has no adverse effect on engine operation.

A still further object of the invention comprises a novel jet engine thrust reversing mechanism which in its forward thrust position cooperates with the engine exhaust to function as an ejector mechanism drawing cooling air over the engine and adding this air to the engine exhaust to increase the exhaust mass flow.

Another object of the invention comprises the provision of a novel jet engine thrust reversing mechanism in which means are provided to produce side thrust for example to facilitate maneuvering the aircraft.

Other objects of the invention will become apparent upon reading the annexed detailed description in connection with the drawing in which:

Fig. 1 is an axial sectional view through the exhaust nozzle end of an aircraft jet engine together with adjacent structure of the aircraft and also illustrating a tail pipe extension embodying the invention;

Fig. 2 is a view similar to Fig. 1 but illustrating the tail pipe extension in its reverse thrust condition;

Figs. 3 and 4 are sectional views taken along lines 3—3 and 4—4 respectively of Fig. 1;

Fig. 5 is a top view, on reduced scale, of Fig. 1;

Fig. 6 is a schematic view of linkage for keeping the two sets of vane elements in synchronism;

Fig. 7 is a perspective view illustrating an aircraft wing having a jet engine mounted therein and embodying the invention; and Fig. 8 is an axial view illustrating a modified construction.

Referring to the drawing there is illustrated the circular aft end of an exhaust nozzle 10 of a jet engine 12, said engine and nozzle being disposed within an aircraft body member 14, such as for example the rear end of the aircraft fusilage, engine nacelle, aircraft wing etc. The engine exhaust gases discharge rearwardly through the nozzle 10 to provide the engine with forward propulsive thrust. The nozzle 10 may be a fixed area nozzle or a variable area nozzle. Thus, as illustrated, the nozzle has a plurality of leaves 16 hinged at 18 and extending axially downstream therefrom and means, not shown, being provided for swinging said nozzle leaves 16 about their hinge axes to vary the nozzle throat area.

A tail pipe extension structure 30 for the nozzle 10 is supported at the aft end of said nozzle. The structure 30 may be supported from the engine 12 or as illustrated from the aircraft body member 14 rigidly connecting it to the aft end of said body member. The tail pipe extension 30 comprises a double walled tubular member 32 co-axially disposed about the aft end of the nozzle 10 in radially spaced relation therewith to leave a space 34 therebetween. The double walled tubular member has radially-spaced inner and outer walls 36 and 38 respectively and extends radially rearwardly of the nozzle 10 with its inner and outer walls preferably being circular. The tubular member 32 forms a streamlined continuation of the aircraft body member 14 and for this purpose the diameter of the outer wall 38 preferably progressively decreases in a downstream direction. In addition the inner wall 36 preferably progressively increases in diameter in a downstream direction. Thus the walls 36 and 38 converge together at their downstream ends.

The tubular member 32 has a pair of diametrically opposed openings 40 and 42. The circumferentially-spaced walls 44 and 46 of the opening 40 are flat and lie in planes parallel to each other and to the axis of the tubular member 32 and are equi-spaced on opposite sides of said axis. The forward end of the opening 40 defines a plane which is inclined inwardly and rearwardly toward said axis and is perpendicular to said flat side walls 44 and 46. The walls of the opening 42 are constructed and disposed similar to those of the opening 40.

A pair of movable vane elements 50 and 52 are disposed within the opening 40 of the tubular member 32, the vane element 52 being disposed downstream of the element 50 in tandem relation thereto. Each of said vane elements has a double walled construction. Thus the vane element has a pair of spaced inner and outer walls 54 and 56 while the vane element 52 has a pair of spaced inner and outer walls 58 and 60, each of said walls preferably being circular in a transverse section. The outer walls 56 and 60 of the vane elements are such that with said elements disposed in their positions of Fig. 1 they substantially close the opening 40 in the tubular member 32 with their outer walls forming a substantially smooth continuation of the adjacent outer wall 38 of said tubular member. Likewise the inner walls 54 and 58 of said vane elements form a substantially smooth continuation of the adjacent inner wall of the tubular member 32 when the vane elements are in their positions of Fig. 1. Thus the inner and outer walls of the vane elements have substantially the same convergence in a downstream direction as the inner and outer walls of the tubular member 32. The vane element 50 has flat walls 62 and 64 along and closing its two sides and the vane element 52 has similar flat walls 66 and 68. With the vane elements 50 and 52 in their positions of Fig. 1, the vane element flat side walls 62 and 66 are disposed adjacent and parallel to the flat side wall 44 of the opening 40 and the flat side walls 64 and 68 are disposed adjacent and parallel to the flat side wall 46 of said opening.

As illustrated, of the pair of vane elements 50 and 52, the rearmost vane element 52 is much longer in an axial direction than the vane element 50. Also the forward end of the longer vane element 52 defines a plane which, in the closed position of said vane element (Fig. 1), is inclined inwardly and rearwardly toward the axis of the tubular member 32 and said plane is perpendicular to the flat side walls 44 and 46 of said opening. The rear end of the vane element 50 is disposed adjacent to the forward end of the vane element 52 and defines a plane which is substantially parallel to said plane of the forward end of the vane element 52. With this construction of the vane elements 50 and 52 and with said elements in their closed positions of Fig. 1, the outer wall 60 of the vane element 52 extends forwardly so as to overlap the rear end of the inner wall of the vane element 50.

The vane elements 50 and 52 have a hollow construction for exhaust gas flow therethrough as hereinafter explained. For strength reasons ribs or spars 69 are secured to and extend in an axial direction (Fig 1) between the inner and outer walls of the vane element 50 and similar ribs or spars 71 are secured to and extend in an axial direction between the inner and outer walls of the vane element 52. These ribs or spars are illustrated in Figs. 3 and 4 but have been omitted from Figs. 1 and 2 for clarity of illustration.

The vane elements 50 and 52 are pivotally supported on the tubular member 32 for pivotal adjustment about axes perpendicular to the axis of the tubular member 32. For this purpose a relatively rigid structural member 70 extends lengthwise between the walls of the tubular member 32, said member being secured to the flat side wall 44 of the opening 40. A first pivot pin 72 is journaled in the member 70 and extends through the flat side wall 44 into the vane element 50, said element being keyed to the pivot pin 72 for rotation therewith. The opposite side of the vane element 50 is pivotally supported in a similar manner by a pivot pin 74, the pivot pins 72 and 74 being axially alined with their pivot axis extending transversely across the tubular member 32. The vane element is pivotally supported in a similar manner by pivot pins 76 and 78. Parallel arms 80 and 82 are connected to the pivot pins 72 and 76 and a link 84 is pivotally connected at its ends to said arms. In addition, the arm 80 has an extension which is pivotally connected to the piston rod 86 of a piston and cylinder fluid motor 88 secured to the tubular member 32.

With the aforedescribed arrangement of the vane elements 50 and 52, operation of the fluid motor 88 produces pivotal movement of said vane elements. The motor 88 is designed for moving the vane elements 50 and 52 to and from their closed positions of Fig. 1 and their open positions of Fig. 2 as well as for positioning said vane elements at intermediate positions. The motor 88 and its linkage connection to the vane elements 50 and 52 are all disposed between the walls of the tubular member 32 as best seen in Figs. 3 and 4.

A second pair of movable vane elements 90 and 92 are disposed within the other side wall opening 42 of the tubular member 32, the vane elements 90 and 92 being similar to the vane elements 50 and 52 respectively. Likewise the vane elements 90 and 92 are pivotally supported in a manner similar to the vane elements 50 and 52. A second fluid motor 94 is mounted between the walls of the tubular member 32, on the same side as the motor 88, said motor 94 being connected to the pivot pins 96 and 98 of the vane elements 90 and 92, respectively, for pivotally moving said vane elements. The linkage connection between the motor 94 and the vane elements 90 and 92 is similar to the corresponding connection of the motor 88 to its associated vane elements.

When the vane elements 50, 52, 90 and 92 are in their positions of Fig. 1 they form a smooth continuation of the inner and outer walls of the tubular member 32 which in turn constitutes a streamlined continuation of the surface of the aircraft body member 14. With the vane elements so positioned and with the engine operating, the engine exhaust gases discharge rearwardly from the nozzle 10 through the tubular member 32. Because the tubular member 32 surrounds the rear end of the nozzle 10 in radially spaced relation and extends rearwardly downstream of the nozzle, the exhaust gases discharging through the tubular member 32 draw cooling air over the nozzle through the space 34 as indicated in Fig. 1. The space 34 may communicate at its forward end with the surrounding atmosphere or, in the case of a turbo-jet engine, the engine compressor may supply air to this space. Thus in the condition of Fig. 1 the tubular member functions to provide an ejector pump action for drawing cooling air flow over the engine and its exhaust nozzle thereby forming an ejector nozzle.

The downstream ends of the relatively long rearmost vane elements 52 and 92 are shaped so that when their aft ends are pivotally swung inwardly they engage each other along a diameter of the tubular member 32 to substantially close said tubular member to axial flow of the engine exhaust gases therethrough as shown in Fig. 2 and by dot and dash lines in Fig. 4. At the same time the rear ends of the shorter vane elements 50 and 90 also swing inwardly so that they function as turning vanes for the exhaust gases. Actually since each vane 50 and 90 has inner and outer walls and is hollow, the exhaust gases flow outwardly between said walls whereby each said wall functions as a turning vane.

When the vane elements are swung to their reverse thrust positions of Fig. 2, axial flow of the engine exhaust gases through the tubular member 32 is substantially blocked and said exhaust gas flow is turned forwardly by said vane elements to provide the jet engine with reverse thrust. In order to effect this turning, the turning passages must have the necessary solidity. By solidity is meant the ratio of the length, of the turning passages (in the direction of the flow therethrough) to their width. As already stated, because of their double walled construction, each of the inner and outer walls of vane element 50 and 90 in effect forms a separate turning vane whereby each vane element 50 and 90 provides two turning vanes. With this double wall construction the necessary solidity of the turning path is obtained with but a pair of turning vane elements 50 and 52 on one side of the tubular member 32 and a corresponding pair 90 and 92 on the other side and, in their reverse thrust positions, said vane elements project only a short distance beyond the outer surface of said tubular member.

Each of the long rearmost vane elements 52 and 92 may have one or more openings 100 and 102 respectively through their inner walls. With this construction, a portion of the exhaust gases flows outwardly and forwardly through the space between the inner and outer walls of said elements 52 and 92 when they are in their reverse thrust positions (Fig. 2) thereby increasing the flow area of the reverse thrust passages.

The vane elements 50, 52, 90 and 92 may also be used for modulating or spoiling the forward thrust output of the engine without actually reversing the thrust. For this purpose, said vane elements would be pivotally swung inwardly to intermediate positions providing the desired thrust modulation.

With a separate actuating fluid motor 88 for the pair of vane elements 50 and 52 and another motor 94 for the pair of vane elements 90 and 92 each pair of vane elements may be opened independently of the other pair. This may be desirable so that side thrust may be provided to aid in maneuvering the aircraft. If desired, however, a single fluid motor may be connected to both pairs of vane elements to insure their operation in synchronism. In lieu of or in addition to the use of a single such actuating motor the pairs of vane elements may be mechanically connected together to insure their synchronism. Such a mechanical connection is illustrated in Fig. 6.

In Fig. 6, arms 110 and 112 are connected to the pivot pins 74 and 78 of the vane elements 50 and 52. The arms 110 and 112 are connected by a link 114. A link 116 has one end connected to an extension of the arm 110 and its other end is pivotally connected to a pin 118 which rides in a slot 120 in a fixed member 122. The corresponding pivot pins of the other pair of vane elements 90 and 92 are connected by similar linkage to the pin 118. This linkage interconnection mechanically insures equal and opposite pivotal movements of the two pairs of vane elements. When provided, the linkage providing this mechanical interconnection is housed between the walls of the tubular member 32 diametrically opposite to the fluid actuating motor means.

The tail pipe extension thrust reversing structure described can be used with all types of jet engines and all types of installations and it is easy to install and service. It comprises a simple construction with but a minimum number of moving parts. In their reverse thrust positions, the two rearmost vane elements 52 and 92 provide the mechanical blockage of the rearward discharge of the engine exhaust gases and the double walled forward vane elements 50 and 90 provide the required solidity in the reverse flow passage for high efficiency. With the vane elements in their forward thrust positions, the tail pipe extension structure provides an aerodynamically clean contour on its internal and external surfaces and said extension functions as an ejector to draw cooling air over the engine and its nozzle. The reverse thrust extension structure can be mounted in various positions, for example with the vane elements opening upwardly and downwardly, as in Fig. 7, or sideways, depending on the installation. Also the openings 40 and 42 in the tubular member 32 need not be diametrically opposed. In fact instead of two such openings and their sets of vane elements it is also possible to use but one opening with its set of vane elements or even more than two such openings. Where but one such opening and set of vane elements are used the downstream vane element should be sufficiently long so that its aft end, when swung inwardly, extends sufficiently far across the tubular tail pipe extension to substantially block axial flow therethrough. For structural reasons the openings 40 and 42 in the tubular member 32 preferably terminate short of the aft end of said member whereby, as illustrated, the aft end of said member is circumferentially continuous.

Because the inner and outer walls of the tail pipe extension structure 30 substantially converge at their downstream ends and since all the actuating mechanism is housed between said walls, said structure has substantially zero base drag when the vane elements are in their forward thrust or closed positions of Fig. 1. It should also be noted that both the tubular member 32 and its vane elements have an operating function in all positions of said elements. Thus in their forward thrust positions (Fig. 1), the vane elements cooperate with the tubular member 32 to provide an ejector tube arrangement for drawing cooling air over the engine and in their reverse thrust positions (Fig. 2) said vane elements cooperate with said tubular member to provide reverse thrust.

As already stated, with the vane elements in their positions of Fig. 1, the tail extension structure 30 cooperates with the exhaust nozzle 10 to provide an ejector action which draws cooling air over the engine. The performance of this ejector depends on the ratio of the diameter at the aft end of the tubular member 32 and the discharge diameter of the nozzle 10 as well as on the ratio of the axial distance between the aft ends of the tubular member 32 and the nozzle 10 to the discharge diameter of said nozzle. With the vane elements in their ejector position of Fig. 1, the inner and outer walls of the extension structure are quite smooth and therefore said extension structure can readily be mounted for retraction into and extension from the aircraft body member to vary the ejector performance. Thus at low speed operation of the jet engine it generally would be desirable to retract the extension structure. Such an arrangement is diagrammatically shown in Fig. 8. For ease of understanding, those parts of Fig. 8 corresponding to the parts of Figs. 1–7 have been designated by the same reference numerals but with a subscript *a* added thereto. Fig. 8 is an axial sectional view like Fig. 1 but the plane of the section is rotatively displaced ninety degrees from that of Fig. 1.

In Fig. 8, the aft end of the aircraft body member 14*a* has an annular recess 120 for receiving the forward end of the tail pipe extension structure 30*a*. Also fluid motor means 122 is housed within the aircraft body member and is connected to the forward end of the extension structure 30*a* for example by a piston rod 124. With this arrangement, when the vane elements 50*a*, 52*a*, 90*a* and 92*a* are in their ejector positions, the motor means 122 can be operated for further extending the structure 30*a* from the aircraft body member 14*a* or for further retracting said structure into said body member. Because the extension structure 30*a* is axially movable flexible fluid pressure connections 126 and 128 are provided for supplying the actuating fluid to the fluid motors for operating the vane elements in Fig. 8. Except for the extension and retraction feature of the tail pipe extension the structure of Fig. 8 is like that of Figs. 1–7.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A tail pipe extension for jet engines including fixed and movable structure of double walled construction, said movable structure comprising at least a pair of tandem disposed vane elements with the rearmost vane element of said pair being substantially longer in a direction parallel to the longitudinal axis of the extension than the other vane, said vane elements being so shaped and having first positions in which they substantially close an opening in the side wall of said extension and form substantially smooth continuing parts of the extension; and means carried by said extension and operatively connected to said vane elements for pivotally moving said vane elements from their said first positions toward second positions in which their aft ends are inclined inwardly to open said side wall openings for exhaust gas flow outwardly therethrough and said longer vane element extends inwardly across said extension to a greater extent than the other vane element of said pair, the shorter vane element of said pair having a hollow open-ended construction so that when pivotally moved toward its said second position it provides a flow passage between its walls for exhaust gas flow outwardly therebetween as well as around said walls.

2. A tail pipe extension as recited in claim 1, in which said vane element pivotal moving means is housed between the double walls of said fixed structure.

3. A tail pipe extension as recited in claim 1 in which the outer wall of the extension progressively decreases in diameter toward the downstream end.

4. A tail pipe extension as recited in claim 1 in which said longer vane element has a hollow double-walled construction with an apertured inner wall for exhaust gas flow outwardly therethrough when pivotally moved toward its said second position.

5. A tail pipe extension as recited in claim 1 in which the outer wall of the longer vane element of said pair extends forwardly of its inner wall so that when the vane elements are in their said first positions the outer wall of said longer vane element overlaps the aft end of the inner wall of the shorter vane element of said pair.

References Cited in the file of this patent

UNITED STATES PATENTS

| | | |
|---|---|---|
| 2,620,622 | Lundburg | Dec. 9, 1952 |
| 2,637,164 | Robson et al. | May 5, 1953 |
| 2,651,172 | Kennedy | Sept. 8, 1953 |

FOREIGN PATENTS

| | | |
|---|---|---|
| 1,092,654 | France | Nov. 10, 1954 |